Oct. 20, 1970  F. M. ROGALLO  3,534,931
VARIABLE AREA FLEXIBLE WINGS
Filed March 28, 1968  4 Sheets-Sheet 1

INVENTOR.
FRANCIS M. ROGALLO
ATTORNEYS

Oct. 20, 1970     F. M. ROGALLO     3,534,931
VARIABLE AREA FLEXIBLE WINGS
Filed March 28, 1968     4 Sheets-Sheet 3

INVENTOR.
FRANCIS M. ROGALLO
BY
ATTORNEYS

Oct. 20, 1970 F. M. ROGALLO 3,534,931
VARIABLE AREA FLEXIBLE WINGS
Filed March 28, 1968 4 Sheets-Sheet 4

INVENTOR.
FRANCIS M. ROGALLO
BY
ATTORNEYS

United States Patent Office 3,534,931
Patented Oct. 20, 1970

3,534,931
VARIABLE AREA FLEXIBLE WINGS
Francis M. Rogallo, 17 Milford Road,
Newport News, Va. 23601
Filed Mar. 28, 1968, Ser. No. 716,733
Int. Cl. B64d 17/00
U.S. Cl. 244—138        13 Claims

ABSTRACT OF THE DISCLOSURE

A velocity control for a flexible wing aircraft capable of supporting a payload in flight. The velocity of the wing is changed by gathering wing material and releasing wing material to decrease and increase the size of the wing area.

---

The invention described herein was made by an employee of the United States Government and may be manufactured and used by or for the Government for governmental purposes without the payment of any royalties thereon or therefor.

This invention relates to a flexible wing vehicle and more particularly to a flexible wing vehicle having mechanism to vary its velocity.

The flexible wing concept has found many uses, one of which is a substitute or replacement for the parachute. The flexible wing provides many advantages over the parachute; a primary advantage being that of additional lift, thus enabling the chutist to have a controlled landing. Although the chutist has various techniques for directional control of the wing which are entirely satisfactory, speed or velocity control of the wing may not be sufficient particularly under greatly varying wing conditions.

One method for obtaining a degree of velocity control has been by pulling and releasing shroud lines which support the payload from the wing. This procedure is used to change the angle of attack of the wing providing some velocity control. As the angle of attack is increased, the horizontal velocity decreases, but the vertical velocity or rate of descent increases. Since a decrease in horizontal velocity results in an increase in vertical velocity, and vice versa, a meaningful control of the resultant velocity is virtually impossible utilizing this technique.

Greater control of the velocity during flight of the flexible wing is highly desirable for several reasons. At higher altitudes a greater velocity is often desirable to buck a strong headwind and provides security for military purposes. However, a lower velocity is desirable for soft landings and is helpful in guiding the wing to a desired landing position.

The present invention overcomes the above difficulties which mechanism for changing the area of the wing during flight. By increasing the area of the wing both the horizontal and vertical velocities are simultaneously decreased. Thus, the chutist at high altitudes utilizes the wing with a reduced area and at lower altitudes and landing can increase the area of the wing to facilitate landing.

It is therefore an object of this invention to provide a flexible wing, the velocity of which can be varied.

Still another object of the invention is to provide a flexible wing wherein the speed can be varied by varying the area of the wing.

Another object of the invention is to provide a flexible wing wherein the velocity of the wing can be varied by gathering in and letting out flexible wing material.

Yet another object of the invention is to provide a velocity control for a flexible wing by gathering different portions of the flexible wing material.

A further object of the invention is to provide a flexible wing wherein the area of the wing is controlled from the payload.

An additional object of the invention is to provide a flexible wing having mechanism for varying the wing area which is easy to construct, operate, and maintain.

These and other objects and advantages of the invention will become more apparent upon reading the specification in conjunction with the accompanying drawings.

Figure 1:
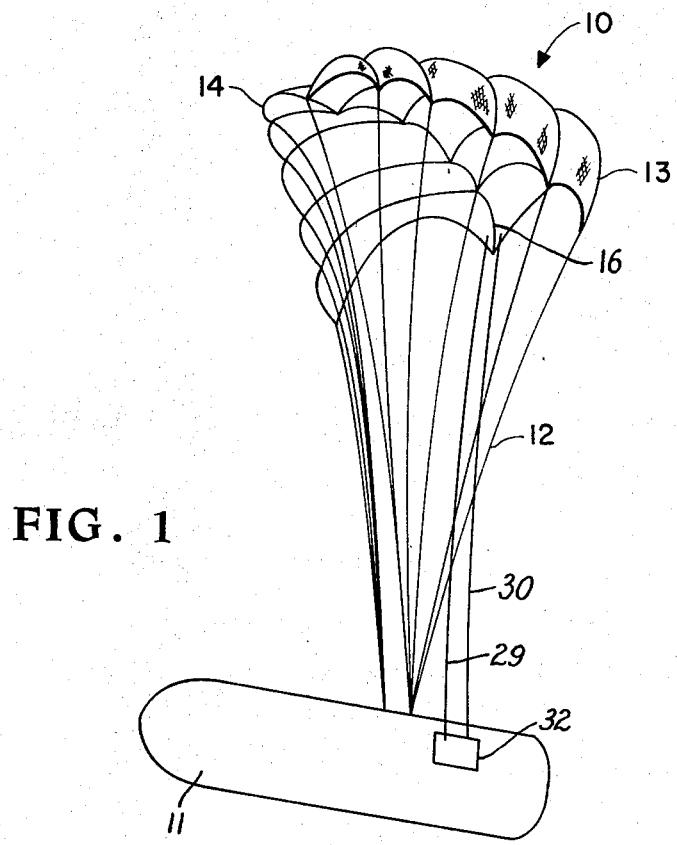
FIG. 1 is a perspective view of a variable area flexible wing shown supporting a chutist as a payload.

Referring now more specifically to the details of the invention, FIG. 1 shows a wing assembly designated generally by reference numeral 10.

The wing itself is designated generally by the reference numeral 10 and consists of outside panels 13 and 14 and an intermediate panel 15. Panels 13 and 15 are joined together along a common line to form a first keel 16 and panels 14 and 15 are joined along another common line to form a second keel 17. The wing panels are made of a flexible material, many types of which are available commercially. It has been found that many of the materials made from synthetic yarns and some of the plastics are particularly useful as flexible wing material. The panels are generally triangular in shape and may have a cutoff or blunted apex to form the wing design. In a completely flexible or limp flexible wing the keel may be no more than the common line formed by the wing panels being joined together. However, the keel may also take a semirigid or rigid configuration depending on the particular circumstances under which the wing is to be utilized. The shroud lines 12 are shown connected to the keel and directed across the wing panel and over the leading edge area of the flexible wing material. This particular arrangement of the shroud lines tends to lend structural support to the overall configuration. It should be understood, however, that the shroud lines may be connected at various points to the wing, a common practice also being to connect the shroud lines adjacent the leading edges of the wings.

The area of the wing is changed by moving the keels 16 and 17 to and away from a position of adjacency.

Figure 2:
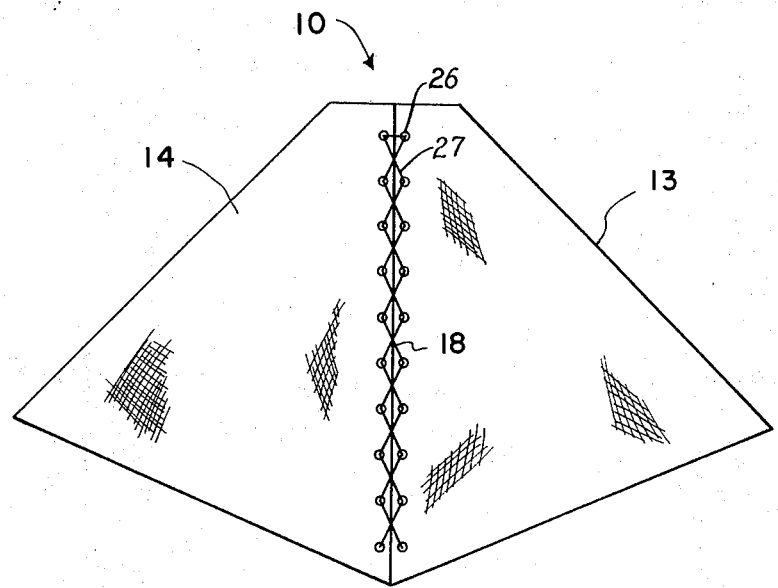
FIG. 2 is a twin keel flexible wing configuration shown in its high-velocity configuration.
Figure 3:
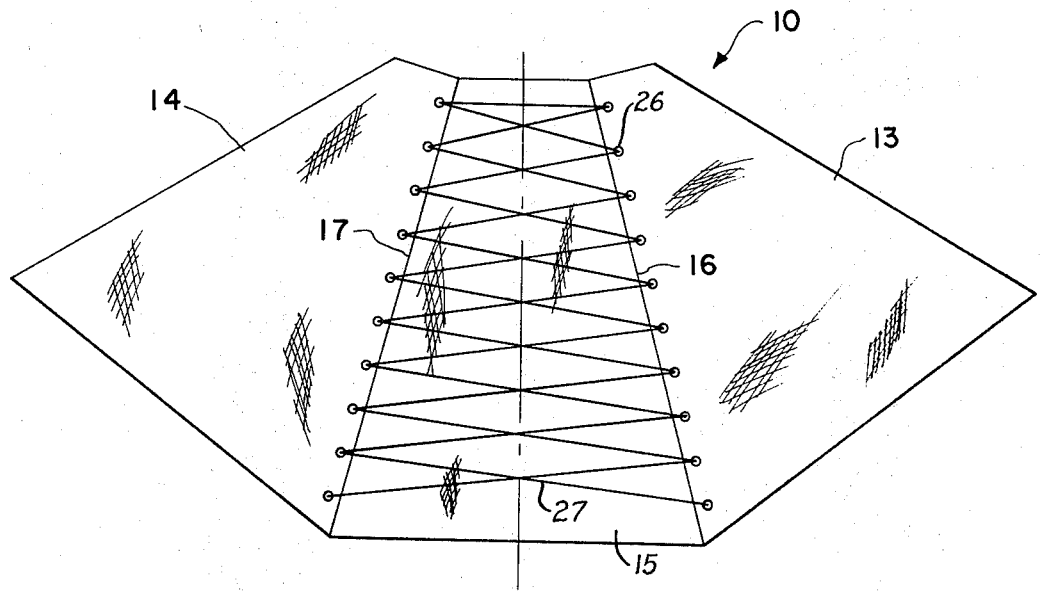
FIG. 3 is the flexible wing of FIG. 2, shown in its low-velocity configuration.

When the keels are moved together the flexible wing material is gathered. FIG. 3 shows the area of the flexible wing which is gathered as being the intermediate panel between the keels 16 and 17. The keel lines 16 and 17 in FIG. 3 are also representative of the sides of a zipper which are shown in greater detail in FIG. 12. Each half of the zipper is sewn or otherwise attached to the flexible wing material along the keel line. When the zipper 18 is closed, the material is gathered along a common line over or under the keels depending on which side of the flexible material the zipper has been sewn. This reduces the overall area of the wing as shown in FIG. 2 providing a high-velocity configuration.

Figure 13:
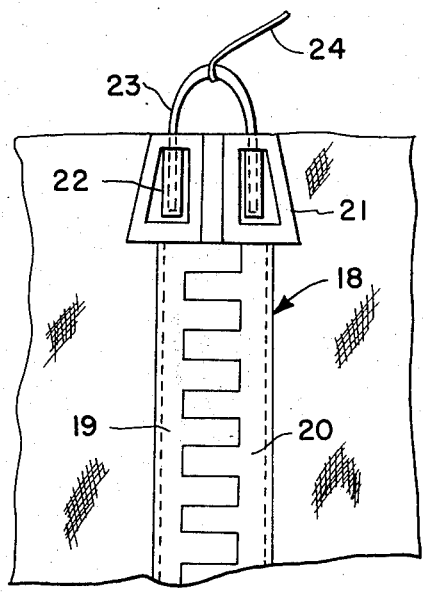
FIG. 13 is a partial view of a zipper and release mechanism utilized for gathering and releasing the flexible wing material.

As shown in FIG. 13, a zipper slide 21 of conventional design is utilized to connect the zipper in the usual manner. Affixed to the slide 21 are connector tubes 22 which receive a generally U-shaped connector 23, the ends of which are insertible into the tubes 22. The connector 23 can be secured to the slide 21 in any suitable manner. A release 24 is fixed to the connector 23 as shown in FIG. 13. It is merely a cord or wire which may be pulled by the chutist. The ends of the zipper halves 19 and 20 are designed so that when the release 24 is pulled, the slide 21 is pulled off from the zipper allowing the zipper halves to separate. Since the release is normally actuated during flight of the flexible wing, and the wing is inherently flexible material will cause it to ripple and move resulting in action which causes the zipper to readily separate and thereby release the gathered material forming a low-speed wing configuration.

Although a zipper has been shown as illustrative of a means whereby the material may be gathered, it should be undersood that other techniques are readily applicable to gathering and release of flexible wing material. For instance, the material could be gathered by stitching wherein breaking of one of the stitches causes the entire group to ravel. The material might be provided with eyelets along the keels 16 and 17 and be tied or laced together at various points along the keels. Mechanism could be provided for untying the material thus allowing expansion of the wing. Obviously, other techniques could be utilized which would fall within the scope of the invention.

The release 24 is shown as a cord or wire which can be actuated manually by the chutist. It should be understood, however, that it would be well within the scope of the invention to provide release of the slide 21 by mechanism such as a solenoid. Again, it is apparent that many types of actuators might be utilized to release the slide or otherwise activate mechanisms which might be utilized to gather the material. The release cord can be threaded through guides which can be attached to one of the shroud lines to keep it from tangling with other shroud lines and also provide an arrangement readily accessible for actuation by the chutist.

Although it is contemplated that the mechanism utilized for gathering and releasing the flexible wing material would be designed primarily for gathering the material on the ground and then releasing it in flight, it should be understood that the material could be both gathered and released during flight. This is accomplished by placing eyelets 26 in the wing, adjacent the keels, such as the keels 16 and 17 as shown in FIGS. 2 and 3. A nylon cord 27 or a cord of some similar material is then laced through the eyelets in much the same manner as a shoe is laced. The ends of the cords 29 and 30 are attached to a drum of a windlass or some other type of winding mechanism 32 which will take in and pay out the cord. The winding mechanism 32 is located within the payload 11. It is believed to be apparent that drawing on the lacing would close the flexible wing material as well as releasing the lacing would allow the material to expand.

Although a single lace is shown as running from the leading edge of the wing to the trailing edge of the wing, it is to be understood that under certain circumstances it may be desirable to lace the wing in sections. For example, the front quarter of the wing is laced with one cord, the middle two quarters with other cords and the trailing edge quarter with still another cord. The ends of all the cords are then attached to the winding mechanism.

The wing material can be gathered and released by using a combination of zipper and lacing, the zipper being used to gather the material and maintain the wing initially in its reduced configuration, and the lacing thereafter used to gather the material once it has been released. The zipper alone can also be used to gather and release the material. A wing which is pie-shaped and fans out from the apex would be particularly suitable for use with a zipper. The zipper is run to the apex of the wing to release the gathered material and run back to the trailing edge to gather the material.

Figure 4:
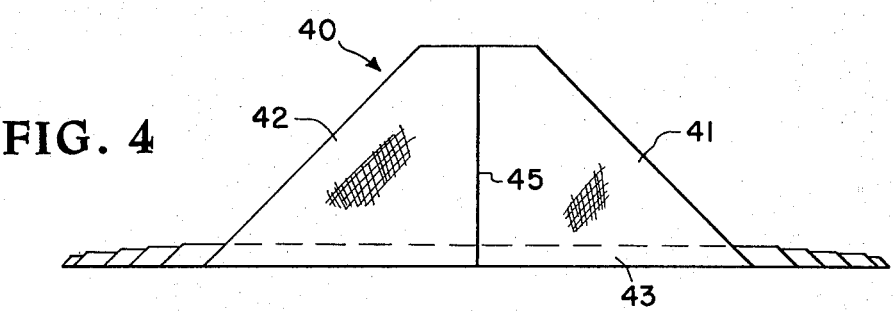
FIG. 4 is a flexible wing having the trailing edges thereof gathered under to form a high-velocity configuration.
Figure 5:
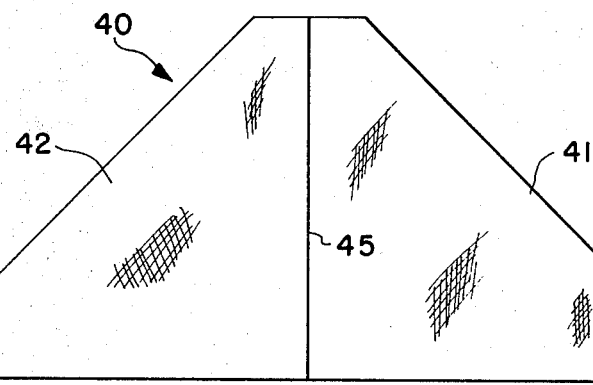
FIG. 5 is the flexible wing of FIG. 4 showing the gathered portion extended to provide a low-velocity configuration.

FIGS. 4 and 5 illustrate another embodiment wherein the area of the wing may be changed. This wing is designated generally by the reference numeral 40 and includes wing panels 41 and 42 which are joined together along a common line to form a keel 45. The area of the wing 40 is varied by folding, rolling or otherwise displacing a portion of the trailing edge of the wing. The folded or rolled portion is illustrated by the hidden line as shown in FIG. 4, the area between the hidden line and the trailing edge of the wing being designated by reference numeral 43. Obviously, any of the techniques used above may be utilized to hold the flap in the folded position until it is desired to increase the area of the wing at which time the flaps are released. Thus, FIG. 4 shows the wing in the high-speed configuration whereas FIG. 5 shows the wing in the low-speed configuration.

Figure 6:
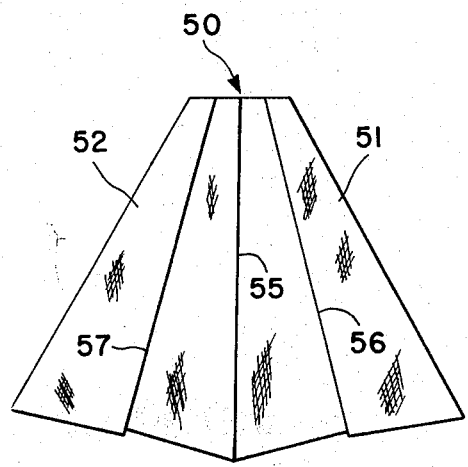
FIG. 6 is a flexible wing showing wing material gathered at two positions intermediate the keel and leading edge members providing a high velocity configuration.
Figure 7:
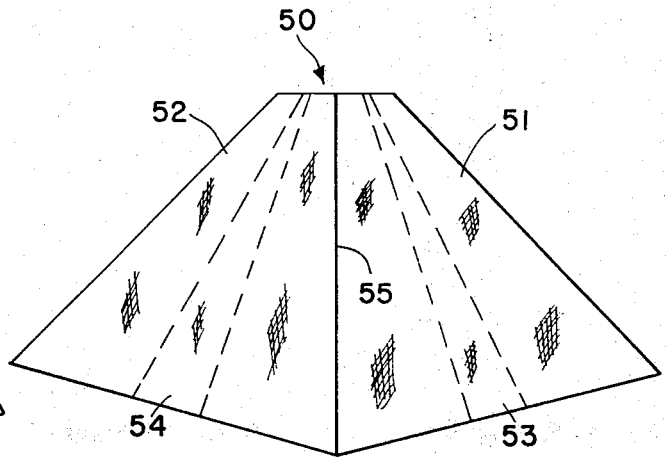
FIG. 7 is the flexible wing of FIG. 6 shown in the low-velocity configuration.

FIGS. 6 and 7 show still another arrangement which may be utilized to vary the area of the wing. The wing in FIGS. 6 and 7 is designated generally by the reference numeral 50. The wing includes wing panels 51 and 52 which are joined along a common line to form a keel 55. In this arrangement the flexible wing material which is gathered is intermediate the keel and leading edges and is gathered at two different points. The material which is gathered is between the dotted lines shown in FIG. 7 and is designated by the reference numerals 53 and 54. This material may be gathered by zippers 56 and 57 along the lines as shown in FIG. 6. The zipper halves will follow the dotted lines shown in FIG. 7, and a release arrangement utilized for each zipper could be similar to that previously described and shown in FIG. 13.

FIG. 6 thus shows the high-speed configuration of the flexible wing and FIG. 7 shows the low-speed configuration thereof. As with the previous embodiments, it should be understood that various techniques may be utilized to gather the flexible wing material as well as mechanisms to release the material.

Figures 8, 9:
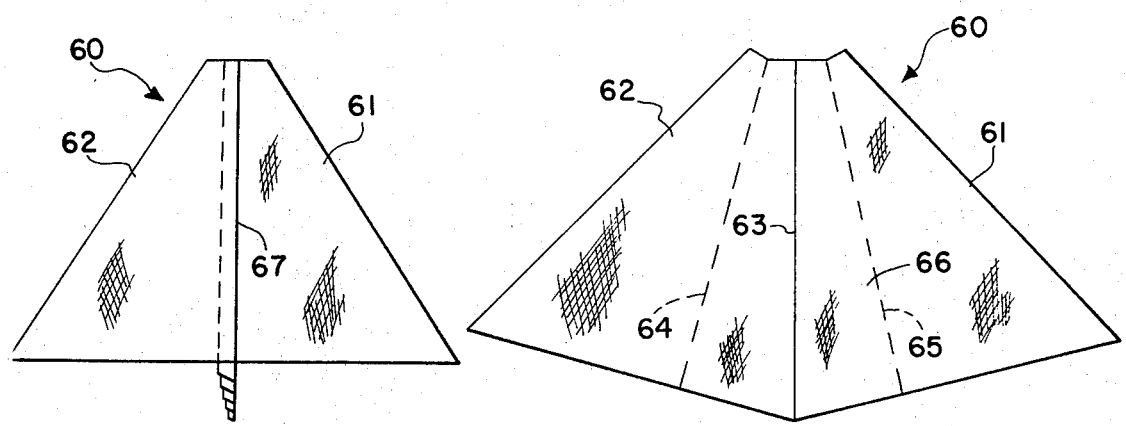
FIG. 8 is a plan view of a variable area flexible wing wherein the material is gathered over the keel, shown in its high-velocity configuration.
FIG. 9 is a plan view of the flexible wing of FIG. 8 shown in the low-velocity configuration.

The flexible wing illustrated in FIGS 8 and 9 shows another version for varying wing area. This wing is designated generally by the reference numeral 60 and has wing panels 61 and 62 which are joined along a common central line to form keel 63. The area between the dotted lines 64 and 65 is the material of the wing which will be gathered and is designated generally by the reference numeral 66. The dotted lines also represent a line along which halves of the zipper or other connector structure would be fixed to the flexible wing.

The connector is shown diagrammatically in FIG. 8 and is designated by the reference numeral 67. The connector 67 may be a zipper arrangement similar to that shown in FIG. 13 or may be of some other previously described or mentioned design. In this embodiment of the invention it is desirable to tie the connector 67 to the keel 63 in some manner or other so as to utilize the keel as well as the connector to carry the payload which is suspended from the wing.

FIG. 8 thus shows the flexible wing of this embodiment in the high-speed configuration, and FIG. 9 the wing expanded in the low-speed configuration.

Figure 10:
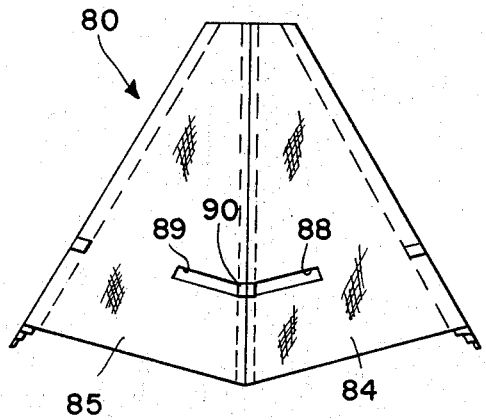
FIG. 10 is a plan view of a variable area flexible wing having rigid leading edge and keel members shown in the high-velocity configuration with the leading edge members used to gather the material.
Figure 11:
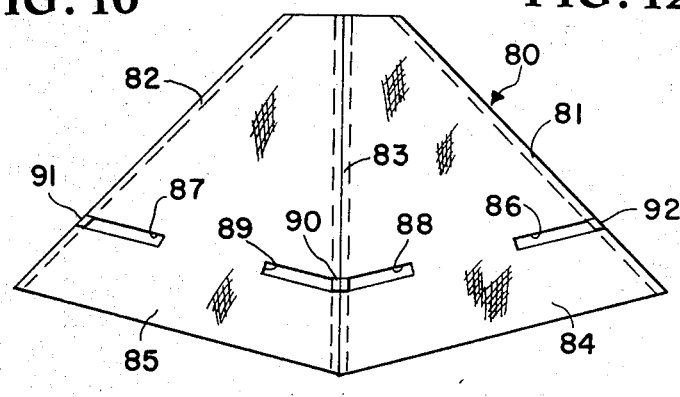
FIG. 11 is a plan view of the variable area flexible wing of FIG. 10 shown in the low-velocity configuration.

FIGS. 10 and 11 show a flexible wing having semirigid or rigid leading edge and keel members utilized with the variable area concept of the invention. This wing is designated generally by the reference numeral 80. The wing has semirigid or rigid leading edge members 81 and 82 and a similar keel 83. The wing panel 84 is connected to keel 83 and leading edge member 81 whereas the flexible wing panel 85 is connected to the keel 83 and leading edge member 82. The leading edge members and keel are not shown connected together at the apex of the vehicle; however, it is to be understood that such an arrangement is well within the scope of the invention.

Figure 12:
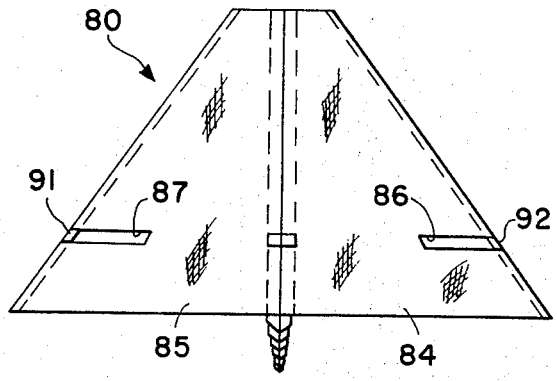
FIG. 12 is a plan view of the variable area flexible wing of FIG. 11 shown in the high-velocity configuration with the keel used to gather the material.

The area of the wing 80 is varied by utilizing the leading edge members 81 and 82 to gather the flexible material. This may be done by rotating the leading edge members toward the keel resulting in the material rolling or folding onto the leading edge members. It is a simple matter to roll the flexible material onto the leading edge members prior to flight and tie the members in this position. The wing when deployed would thus assume the configuration shown in FIG. 10, the high-speed configuration. Upon untying the material rolled on the leading edge members, the flexible wing material would unroll and the wing would assume the low-speed configuration shown in FIG. 11. It is also contemplated that the area of the wing could be varied by rotating the keel which would cause the flexible material to roll up on the keel to gather the material, as shown in FIG. 12. Also, both the leading edge members and keel might be utilized to gather the material.

In using the flexible wing shown in FIGS. 10, 11 and 12, it is desirable to maintain the shroud or support lines, which lead to the payload, the same length regardless of whether the wing is in the low-speed or high-speed configuration. Since the shroud lines are normally attached in some manner to the leading edges and keel of the wings, some mechanism is necessary to prevent the lines from being rolled in with the flexible wing material. This is accomplished by providing the flexible wing material with slots such as 86, 87, 88, and 89 and a bearing arrangement 90, 91, and 92 rotatably mounted on the leading edge members and alined with the respective slots. The shroud lines may be attached to the bearings 90, 91, and 92 and as the leading edge members and/or keel are rotated, they remain essentially stationary allowing the shroud lines to maintain their length. Although only two of the slots and bearing arrangements are shown in FIG. 11, it is to be understood that a series of such slots and bearings would be placed along the leading edge members and keel at points where the shroud lines would be attached to the wing. Tests have shown that slots in the flexible wing material do not adversely affect the aerodynamic characteristics of the wing.

Although FIGS. 10 and 11 illustrate a flexible wing arrangement having rigid superstructure members wherein the leading edge members and keel are utilized to gather the material, it should be understood that semirigid members such as slats might be attached to the flexible wing material intermediate the keel and leading edge members and utilized to gather the flexible wing material. Also, it is apparent that the slats may be of various lengths and designs and be attached at different angles with respect to the keel and leading edge members. For example, the slats may be pie or wedge-shaped to take up the material evenly on the triangular-shaped wing panels.

OPERATION

From the above description, it is believed that the operation of the invention is readily apparent. Assuming the particular flexible wing involved is to be utilized to land an individual, the material would be gathered on the ground prior to the individual being airlifted. The flexible wing would then be packed in much the same manner as a parachute. The shroud lines of the flexible wing would be connected to a harness which the individual would strap on.

The individual would then be airlifted and taken to the vicinity where it would be desired to have the individual land. The individual would jump and deploy the flexible wing thereupon starting his descent. The wing would normally be in the high-speed configuration, thus enabling more rapid horizontal and vertical descent. As the individual would approach the ground, the release would be actuated enabling the wing to increase in area. Once the wing fully deploys, horizontal and vertical descent would both be decreased. With this arrangement, the individual would then have more time to choose a place for proper landing, greater maneuverability, and of course land slower and therefore with less impact. Under certain circumstances, the individual might want to open and close the flexible wing more than once during descent. Such might be the case if the individual were attempting to soar with the flexible wing, and could therefore utilize the variable areas of the wing to take advantage of varying wind currents. If such were the case, an actuator for not only releasing the gathered material, would be necessary but an additional actuator for gathering the material to reduce the size of the wing.

The many advantages of the invention are believed to be readily apparent. By varying the area of the wing, the payload can be delivered more accurately, and with much greater safety. The techniques whereby the area of the wing may be varied are extremely simple and add very little to the cost of the wing. Since the mechanism utilized is simple, it is generally maintenance-free and foolproof in operation. The variable area concept is also readily adaptable to various configurations of flexible wing as illustrated by the various embodiments. Practically any portion of the wing can be gathered along most any direction or angle by most any technique and provide the contemplated results of the invention. For example, in addition to the techniques mentioned, the area of the wing might be varied by attaching a slat to the flexible wing material and rotating the slat. Also, rollers might be utilized to take in portions of the flexible wing material to vary the area. Accordingly, it is apparent that an effective velocity control for the vehicle has been accomplished by the invention.

While a preferred embodiment of the invention and modifications thereof have been described, it will be understood that other modifications and improvements may be made thereto. Such of these modifications and improvements as incorporate the principles of this invention are to be considered as included in the hereinafter appended claims.

What is new and desired to be secured by Letters Patent of the United States is:

1. A variable area flexible wing vehicle or the like capable of supporting a payload in flight comprising:
   a wing constructed of flexible material;
   a keel;
   said wing material forming panels being connected between said keel and leading edges of the wing;
   means operative during flight for gathering and releasing a portion of the panels to vary the area of the wing;
   said wing in its smallest reduced flying configuration itself having a surface area and lift coefficient sufficient to support the payload in a cruise or steady glide condition;
   means to release the gathered panels to increase the surface area of the wing from its reduced configuration at least 50% to effectively vary velocity of the wing in cruising flight without requiring a change in the pitch angle of the wing.

2. A variable area flexible wing vehicle or the like capable of supporting a payload in flight as in claim 1 wherein said flexible wing material is gathered along the keel.

3. A variable area flexible wing vehicle or the like capable of supporting a payload in flight as in claim 1 wherein said flexible wing has two or more keels;
   a wing panel positioned intermediate and connecting said keels;
   said keels being movable to a position of adjacency to gather said flexible wing material.

4. A variable area flexible wing vehicle or the like capable of supporting a payload in flight as in claim 1 wherein shroud lines are connected to the flexible wing material at points along leading edges of the wing;
   a payload suspended from the wing by the shroud lines; and
   means for operating said release means from said payload.

5. A variable area flexible wing vehicle or the like capable of supporting a payload in flight as in claim 1 wherein said flexible wing material is gathered at points intermediate the keel and leading edge of the wings.

6. A variable area flexible wing vehicle or the like capable of supporting a payload in flight as in claim 1 wherein said flexible wing material is gathered by folding up trailing edges of the flexible wing material.

7. A variable area flexible wing vehicle or the like capable of supporting a payload in flight as in claim 1 wherein the leading edges of the wing have rigid leading edge members attached thereto; and means for rotating the leading edge members to gather the flexible wing material and thereby vary the area and velocity of the wing.

8. A variable area flexible wing vehicle or the like capable of supporting a payload in flight as in claim 1 wherein the keel of the flexible wing is rigid, and means for rotating the keel to gather the flexible wing material and thereby vary the area and velocity of the wing.

9. A variable area flexible wing vehicle or the like capable of supporting a payload in flight as in claim 1 wherein the leading edges of the wing have rigid leading edge members fixed thereto; said flexible wing having a rigid keel; and means for rotating said leading edge members and keel to gather said flexible wing material and thereby vary the area and velocity of the wing.

10. A variable area flexible wing vehicle or the like capable of supporting a payload in flight comprising:
   a wing constructed of flexible wing materials;
   a keel;
   said wing material forming panels being connected between said keel and the leading edges of the wing;
   zipper means for gathering a portion of the panels to reduce the area of the wing; and
   means to release the gathered panels to increase the area of the wing and thereby vary velocity of the wing in flight.

11. A variable area flexible wing vehicle or the like capable of supporting a payload in flight as in claim 10 wherein said means for releasing said gathered material is an actuator for releasing said zipper.

12. A variable area flexible wing vehicle or the like capable of supporting a payload in flight as in claim 10 wherein said zipper means has a slide;
   a connector fixed to said slide;
   said means for releasing said gathered material including an actuator;
   said actuator being connected to said connector whereby actuation thereof removes said slide from said zipper to release said zipper.

13. A variable area flexible wing vehicle or the like capable of supporting a payload in flight comprising:
   a wing constructed of a flexible material;
   said flexible material being joined along a common line to form a keel;
   shroud lines connected at points along said keel and traversing said flexible material;
   said shroud lines being secured to the flexible wing material at points along its leading edges;
   a payload attached to said shroud lines and suspended from said wing;
   a zipper having one portion thereof attached to said flexible wing material along one line and another portion thereof along another line;
   a slider for closing said zipper and gathering said flexible wing material to reduce the area thereof;
   a connector for positioning said slider; and
   an actuator for pulling said connector to remove said slider from said zipper releasing said gathered material to increase the area of the wing and thereby vary the flight velocity thereof.

References Cited

UNITED STATES PATENTS

| | | | |
|---|---|---|---|
| 2,107,303 | 2/1938 | Ljungstrom | 114—106 |
| 1,054,374 | 2/1913 | Voigt | 244—142 |
| 2,247,219 | 6/1941 | Childs | 114—104 |
| 3,194,514 | 7/1965 | Rogallo | 244—49 |
| 3,273,828 | 9/1966 | James | 244—43 |
| 3,285,215 | 11/1966 | Potter | 114—106 |
| 3,381,919 | 5/1968 | Girard | 244—49 |
| 3,135,482 | 6/1964 | Girard | 244—43 |
| 3,361,389 | 1/1968 | De Foras | 244—49 |
| 3,396,921 | 8/1968 | Rogallo | 244—43 |

FOREIGN PATENTS

| | | |
|---|---|---|
| 1,213,744 | 3/1966 | Germany. |

MILTON BUCHLER, Primary Examiner

J. E. PITTENGER, Assistant Examiner